(12) United States Patent
Zhang et al.

(10) Patent No.: US 11,714,032 B2
(45) Date of Patent: Aug. 1, 2023

(54) VACUUM SYSTEMS FOR EPOXY MOUNTING OF MATERIAL SAMPLES

(71) Applicant: ILLINOIS TOOL WORKS INC., Glenview, IL (US)

(72) Inventors: Ruibin Zhang, Shanghai (CN); Hengshan Zou, Shanghai (CN); Yun Zhao, Shanghai (CN); Jia Zhang, Shanghai (CN); Matthew Robert Callahan, Deerfield, IL (US); Michael Edward Keeble, Libertyville, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 916 days.

(21) Appl. No.: 16/481,180

(22) PCT Filed: Mar. 22, 2019

(86) PCT No.: PCT/CN2019/079351
§ 371 (c)(1),
(2) Date: Jul. 26, 2019

(87) PCT Pub. No.: WO2020/191552
PCT Pub. Date: Oct. 1, 2020

(65) Prior Publication Data
US 2021/0364397 A1 Nov. 25, 2021

(51) Int. Cl.
*G01N 1/36* (2006.01)
*B29C 37/00* (2006.01)

(52) U.S. Cl.
CPC ............ *G01N 1/36* (2013.01); *B29C 37/006* (2013.01); *G01N 2001/364* (2013.01)

(58) Field of Classification Search
None
See application file for complete search history.

(56) References Cited

U.S. PATENT DOCUMENTS

| 4,649,967 A | 3/1987 | Gruenstein |
| 6,152,902 A * | 11/2000 | Christian ............ A61M 1/0001 604/320 |
| 2013/0291951 A1 | 11/2013 | Carman |

FOREIGN PATENT DOCUMENTS

| CN | 102814912 | 12/2012 |
| CN | 203824802 | 9/2014 |

(Continued)

OTHER PUBLICATIONS

Illinois Tool Works, "Cast N' Vac Castable Vacuum Systems," retrieved from https://www.buehler.com/Brochures/English/Mounting/Cast-N-VacBrochure.pdf, retrieved on Oct. 21, 2019, 4 pages.

(Continued)

*Primary Examiner* — Jyoti Nagpaul
(74) *Attorney, Agent, or Firm* — McAndrews, Held & Malloy, Ltd.

(57) ABSTRACT

Vacuum systems for epoxy mounting of material samples are disclosed. In some examples, a vacuum system may be a castable and/or cold mounting vacuum system that facilitates mounting and/or encapsulation of material samples in epoxy resin under low, vacuum, and/or near vacuum pressure. In some examples, the vacuum system may comprise a flow control device configured to control epoxy flow through a dispensing tube that connects to a hollow vacuum chamber. In some examples, the vacuum chamber may have an opening encircled by a rim sandwiched between upper and lower portions of a sealing ring. A movable lid may be configured to press down on the upper portion of the sealing ring when in a closed position, so as to seal the opening.

21 Claims, 9 Drawing Sheets

(56) References Cited

FOREIGN PATENT DOCUMENTS

| CN | 205374093 | 7/2016 |
|---|---|---|
| CN | 205685708 | 11/2016 |
| CN | 106383045 | 2/2017 |
| CN | 206937959 | 1/2018 |
| CN | 109196353 | 1/2019 |
| JP | 6534237 | 6/2019 |
| KR | 20100052098 | 5/2010 |
| SU | 1613342 | 12/1990 |

OTHER PUBLICATIONS

Struers, "Cito Vac Vacuum Impregnation Unit," retreived from https://publications.struers.com/brochures/english/citovac/?_ga=2.33049852.312061873.1571407100-1055249279.1571407100#/, retrieved on Oct. 21, 2019, 8 pages.
International Search Authority China, International Search Report, Application No. PCT/CN2019/079354, dated Sep. 2, 2019, 5 pages.
International Search Authority China, International Search Report, Application No. PCT/CN2019/079351 dated Dec. 23, 2019, 3 pages.
"PolyVac." Retrieved from the internet on Jul. 24, 2019; https://www.presi.com/en/mounting-machines/140-poly-vac.html.
"Citovac." Retrieved from the internet on Jul. 24, 2019; https://www.struers.com/en/Products/Mounting/Mounting-equipment/CitoVac.

* cited by examiner

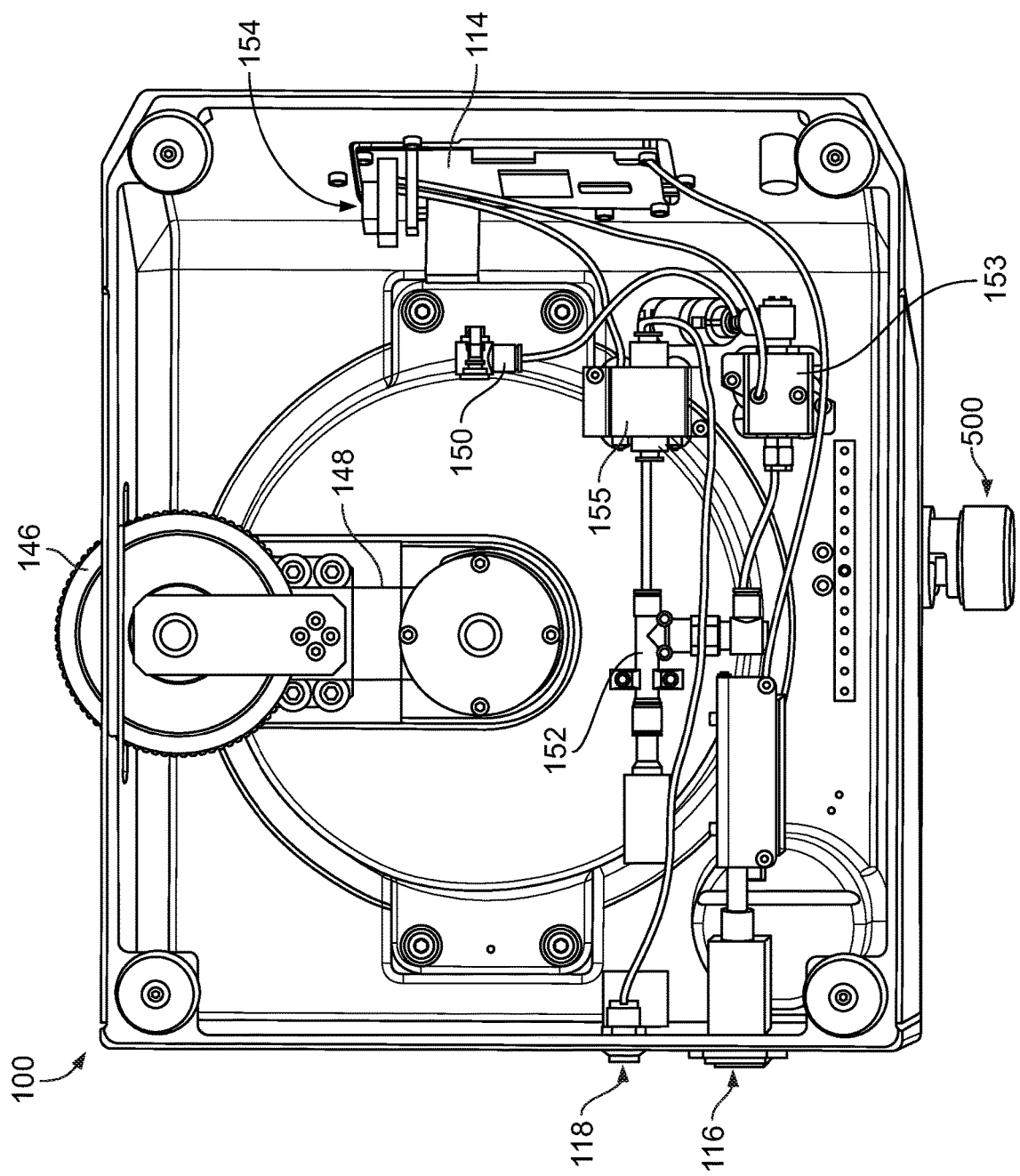

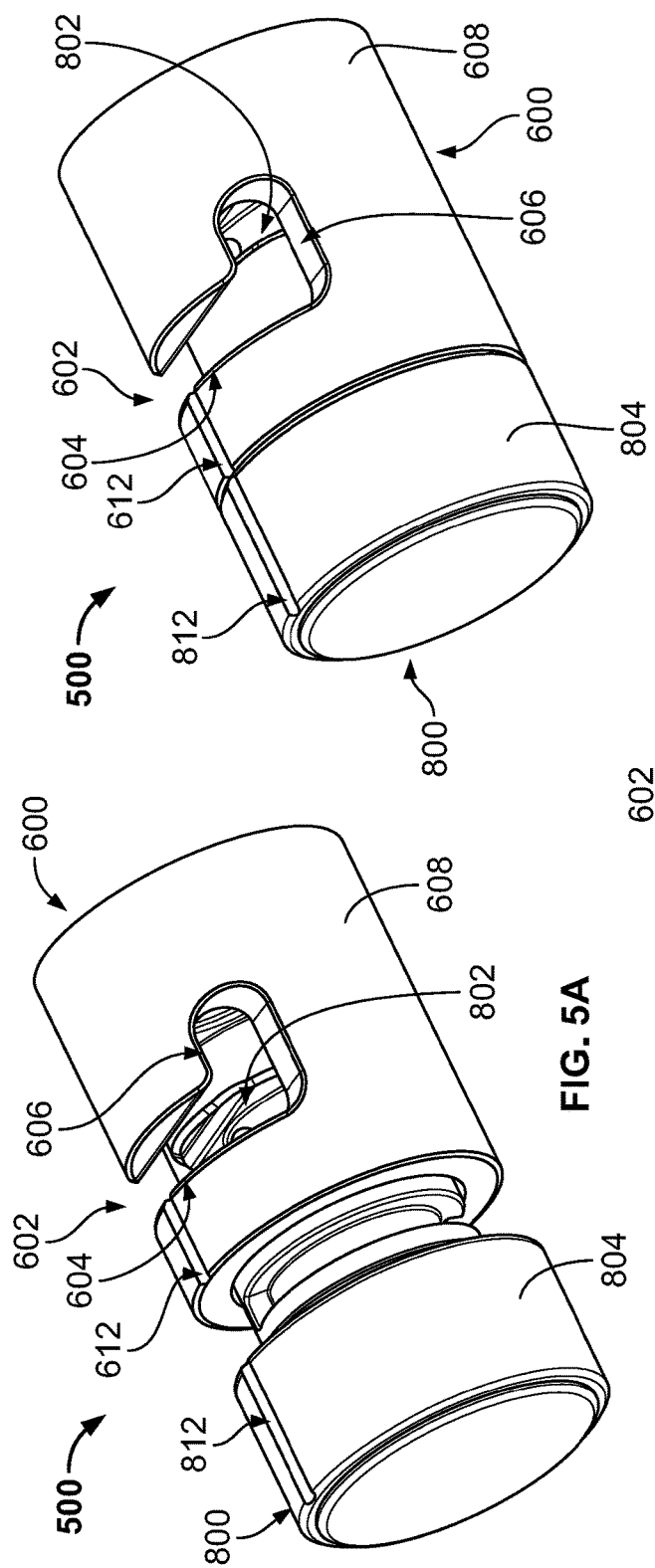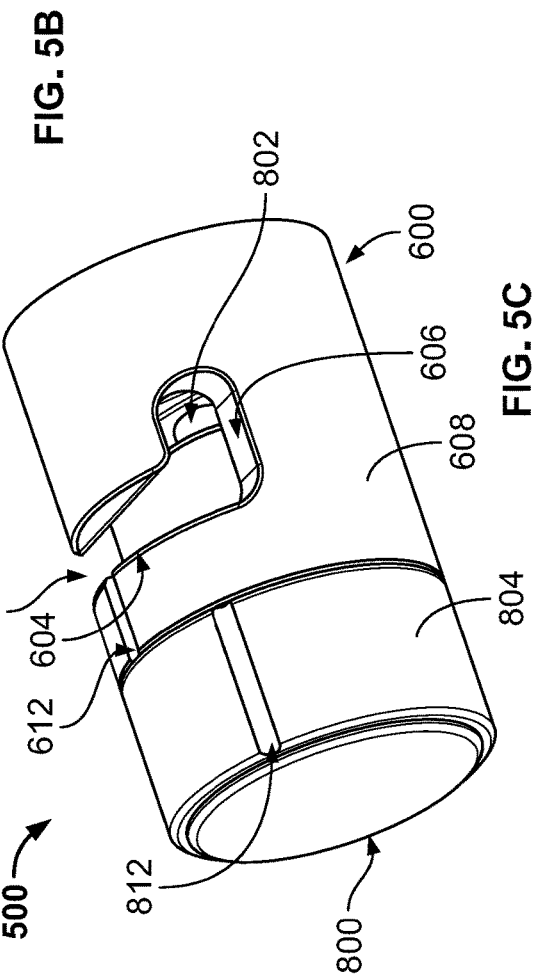

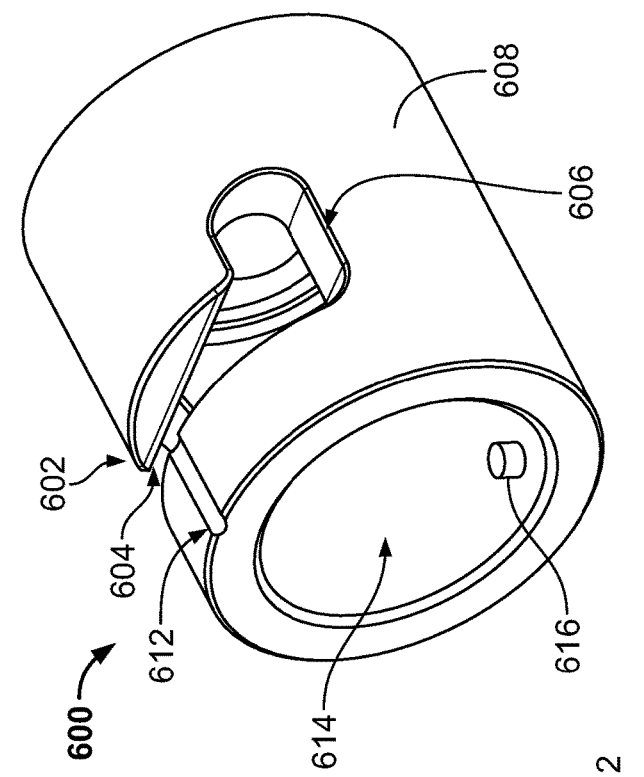
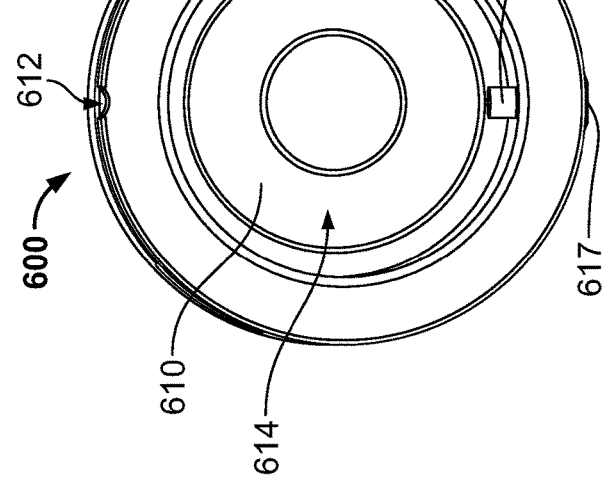
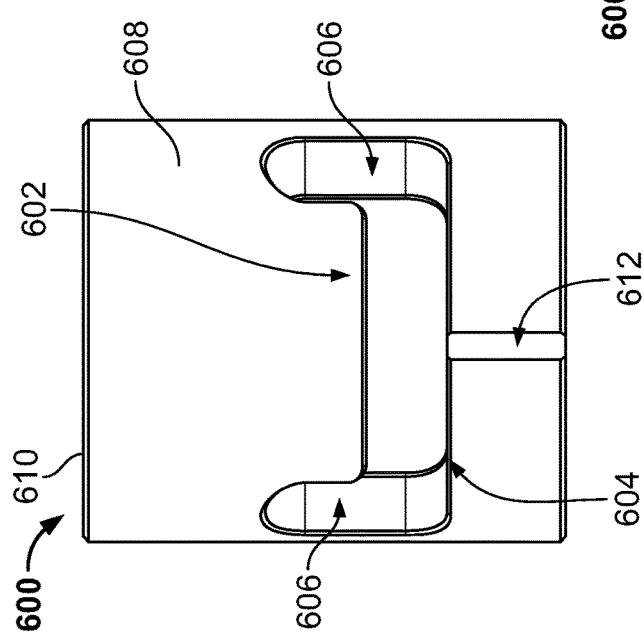

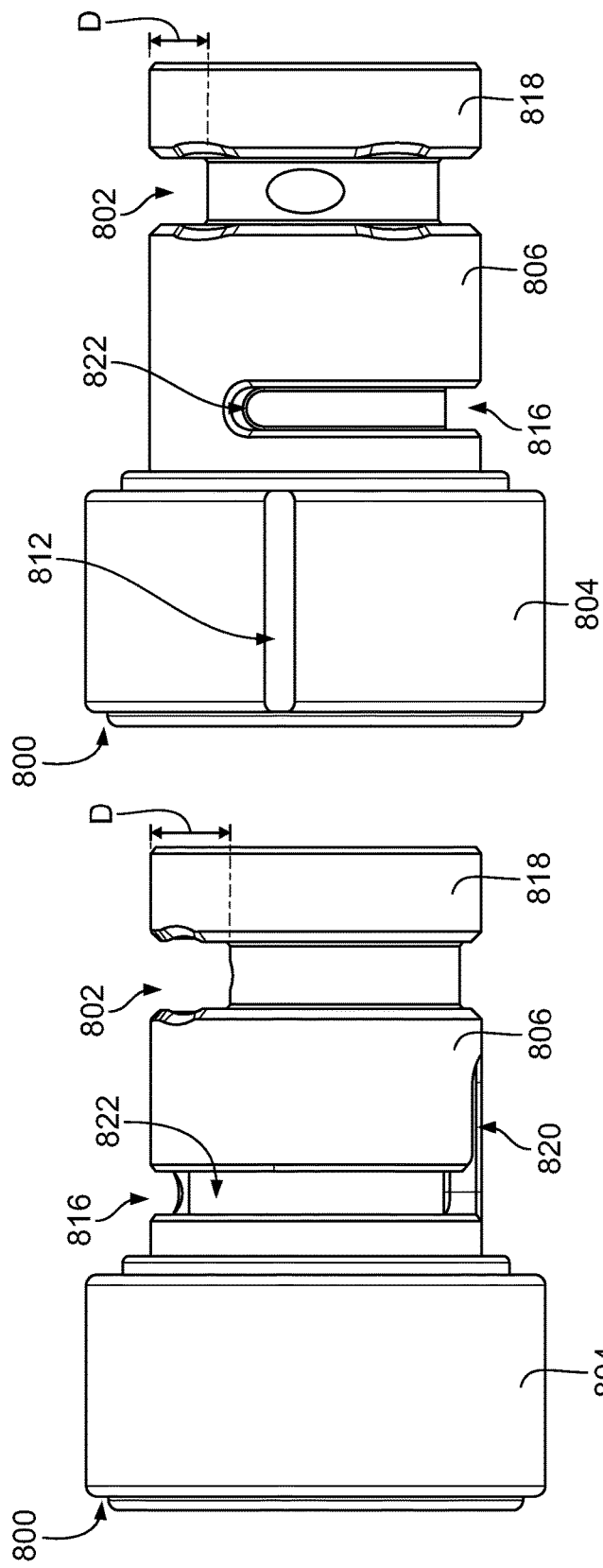
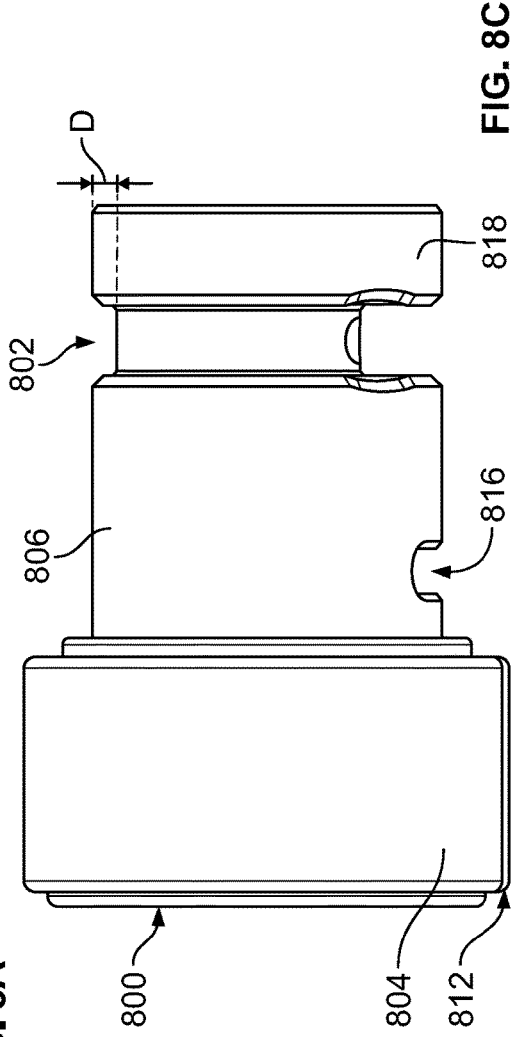
FIG. 8B
FIG. 8C
FIG. 8A

VACUUM SYSTEMS FOR EPOXY MOUNTING OF MATERIAL SAMPLES

TECHNICAL FIELD

The present disclosure generally relates to vacuum systems and, more particularly, to vacuum systems for epoxy mounting of material samples.

BACKGROUND

Material testing systems measure the characteristics and/or behaviors of material specimens (e.g., metals, ceramics, plastics, etc.) under various conditions. Specimens that are brittle, cracked, porous, and/or otherwise sensitive may benefit from cold (also known as castable) mounting in an epoxy resin before testing. Cold mounting is a process of specimen encapsulation in an epoxy resin. Once mounted, the epoxy resin can aid in supporting porous or cracked features of material specimens.

Cold mounting vacuum systems pour an epoxy resin over a material sample in vacuum (or near vacuum) conditions. Conventionally, filling voids (e.g., pores and/or cracks) was difficult due to the air pressure within the voids. However, this difficulty is significantly reduced when a vacuum (or near vacuum) is applied. The vacuum conditions help to remove trapped air from the voids. Subsequent curing at increased pressures will force or push the resin into the voids. This process can enhance help retain and/or support delicate and/or friable material samples.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to vacuum systems for epoxy mounting of material samples, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 3A shows a bottom view of the example vacuum system of FIG. 1A, with a floor removed, in accordance with aspects of this disclosure.

FIG. 5A shows a perspective view of an example flow control device of the example vacuum system of FIG. 1 in an extended position, in accordance with aspects of this disclosure.

FIG. 5B shows a perspective view of the example flow control device of FIG. 5A in a retracted position, in accordance with aspects of this disclosure.

FIG. 5C shows a perspective view of the example flow control device of FIG. 5A in a retracted and rotated position, in accordance with aspects of this disclosure.

FIG. 6A shows a top view of an example sheath of the example flow control device of FIG. 5A, in accordance with aspects of this disclosure.

FIG. 6B shows a perspective view of the example sheath of FIG. 6A, in accordance with aspects of this disclosure.

FIG. 6C shows a front view of the example sheath of FIG. 6A, in accordance with aspects of this disclosure.

FIGS. 8A-8C show side views of an example knob of the flow control device of FIG. 5A at different rotations, in accordance with aspects of this disclosure.

The figures are not necessarily to scale. Where appropriate, the same or similar reference numerals are used in the figures to refer to similar or identical elements.

DETAILED DESCRIPTION

Figure 1A:
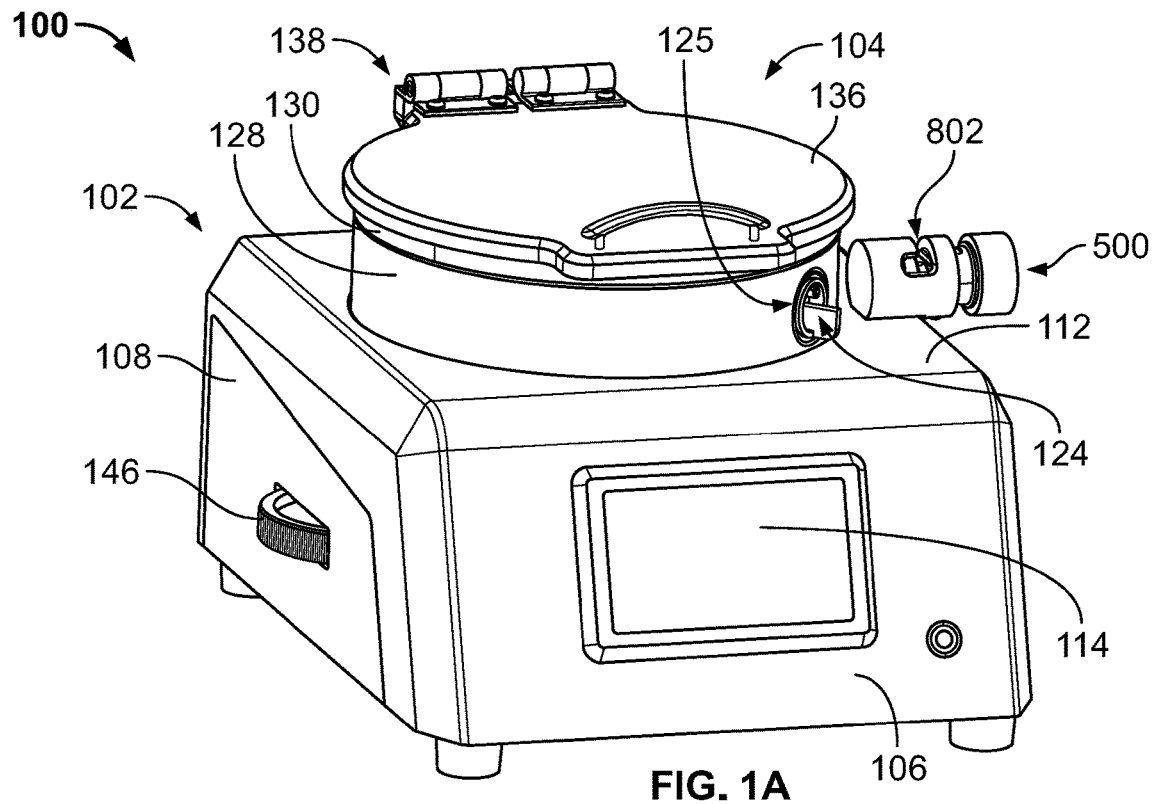
FIG. 1A shows a perspective view of an example vacuum system with a lid in a closed position, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As used herein, the terms "e.g.," and "for example" set off lists of one or more non-limiting examples, instances, or illustrations.

As used herein, the term "fluid," when used as a noun, refers to a free-flowing deformable substance with no fixed shape, including, inter alia, gas (e.g., air, atmosphere, etc.), liquid (e.g., water, solution, etc.), and/or plasma.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit and/or control circuitry may include digital and/or analog circuitry, discrete and/or integrated circuitry, microprocessors, DSPs, etc., software, hardware and/or firmware, located on one or more boards, that form part or all of a control circuit, and/or are used to control a vacuum system.

Some examples of the present disclosure relate to a vacuum system for epoxy mounting of material samples, comprising a vacuum chamber that is substantially hollow, the vacuum chamber comprising a sidewall having a rim overhanging a groove, the rim defining a perimeter of an opening, a flexible seal having a lower portion fit within the groove and an upper portion overlaying at least a portion of the rim such that the portion of the rim is sandwiched between the lower and upper portions of the flexible seal, and a lid movable between an open position in which the opening is uncovered and a closed position in which the lid covers the opening, where the upper portion of the flexible seal is sandwiched between the lid and the rim when the lid is in the closed position, thereby sealing the opening.

In some examples, the upper portion and lower portion of the flexible seal are connected at a living hinge. In some examples, the upper portion extends away from the rim when the lid is in the open position. In some examples, the system further comprises a vacuum generator in fluid communication with the vacuum chamber, the vacuum generator configured to lower air pressure within the vacuum chamber. In some examples, the system further comprises a user interface in electrical communication with control circuitry, the control circuitry configured to control the vacuum generator to cyclically lower air pressure within the vacuum chamber based on input received via the user interface. In some examples, the input comprises one or more of a number of vacuum cycles, a vacuum level of each vacuum cycle, a time between vacuum cycles, or a time of each vacuum cycle. In some examples, the system further comprises a housing, the vacuum chamber and vacuum generator being positioned at least partially within the housing. In some examples, the system further comprises a rotatable platform positioned within the vacuum chamber, the rotatable platform configured for rotation via an actuator that extends through an aperture of the housing. In some examples, the sidewall comprises a socket configured to receive a plug, the plug comprising a spout configured to dispense epoxy within the vacuum chamber. In some examples, the lid is hingedly coupled to the sidewall.

Some examples of the present disclosure relate to a vacuum system for epoxy mounting of material samples, comprising a vacuum chamber comprising a cylindrical sidewall having a groove, an annular rim positioned at least partially over the groove, a sealing ring having first portion and a second portion, the first portion being positioned in the groove, an opening defined by the cylindrical sidewall, annular rim, and sealing ring, and a lid movable between an open position in which the opening is uncovered and a closed position in which the lid covers the opening, wherein the second portion of the sealing ring is sandwiched between the lid and the rim when the lid is in the closed position, thereby sealing the opening.

In some examples, the first portion and second portion of the sealing ring are connected at a living hinge. In some examples, at least a portion of the first portion is raised over the rim when the lid is in the open position. In some examples, the system further comprises a vacuum generator in fluid communication with the vacuum chamber, the vacuum generator configured to adjust air pressure within the vacuum chamber. In some examples, the system further comprises a user interface in electrical communication with control circuitry, the control circuitry configured to control the vacuum generator to cyclically adjust air pressure within the vacuum chamber based on input received via the user interface. In some examples, the input comprises one or more of a number of vacuum cycles, a vacuum level of each vacuum cycle, a time for each vacuum cycle, or a time between vacuum cycles. In some examples, the system further comprises a housing, the vacuum chamber and vacuum generator being positioned at least partially within the housing. In some examples, the system further comprises a rotatable platform positioned within the vacuum chamber, the rotatable platform configured for rotation via an actuator that extends through an aperture of the housing. In some examples, the sidewall comprises a socket configured to receive a plug, the plug comprising a spout configured to dispense epoxy within the vacuum chamber. In some examples, the lid is hingedly coupled to the sidewall.

Some examples of the present disclosure relate to vacuum systems (e.g., castable and/or cold mounting vacuum systems) that facilitate mounting and/or encapsulation of material samples in epoxy resin under low, vacuum, and/or near vacuum pressure. In some examples, a vacuum system may comprise a flow control device configured to control fluid (e.g. epoxy) flow through a dispensing tube. The dispensing tube may connect to a conduit that is sealingly fitted in a socket of a hollow vacuum chamber via a plug.

In some examples, the vacuum chamber may have an opening defined (at least in part) by a rim sandwiched between upper and lower portions of a sealing ring. A movable lid may be configured to press down on the upper portion of the sealing ring when in a closed position, so as to seal the opening. The vacuum chamber may additionally be in controllable fluid communication with a vacuum generator configured to adjust air pressure within the vacuum chamber, so as to create a low and/or near vacuum pressure environment. Control circuitry may be in electrical communication with valves that control whether the vacuum chamber is in fluid communication with the vacuum generator. The control circuitry may control the valves (e.g., based on input received via a user interface) to allow the vacuum converter to (or prohibit the vacuum converter from) changing air pressure within the vacuum chamber.

FIGS. 1A-3B depict examples of a vacuum system 100. As shown, the vacuum system 100 includes a housing 102 and a vacuum chamber 104 positioned at least partially within the housing 102. The housing 102 includes a front panel 106, side panels 108, a rear panel 110, a floor (not shown), and a ceiling 112. In the examples of FIGS. 1A-2A, a user interface 114 is disposed on the front panel 106. In some examples, the user interface 114 may be a display screen having a touch screen interface. In some examples, the user interface 114 may include buttons, knobs, speakers, microphones, levers, dials, keypads, and/or other input/ output devices. The vacuum chamber 104 further includes an electrical connector 116 and compressed air connector 118 on the rear panel 110 of the housing 102. In some examples, the compressed air connector 118 is configured for connection to a source of compressed (or pressurized) air. In some examples the electrical connector 116 is configured for connection with an electrical power source. The user interface 114 is in electrical communication with the electrical connector 116 on the rear panel 110 of the housing 102.

Figure 1B:
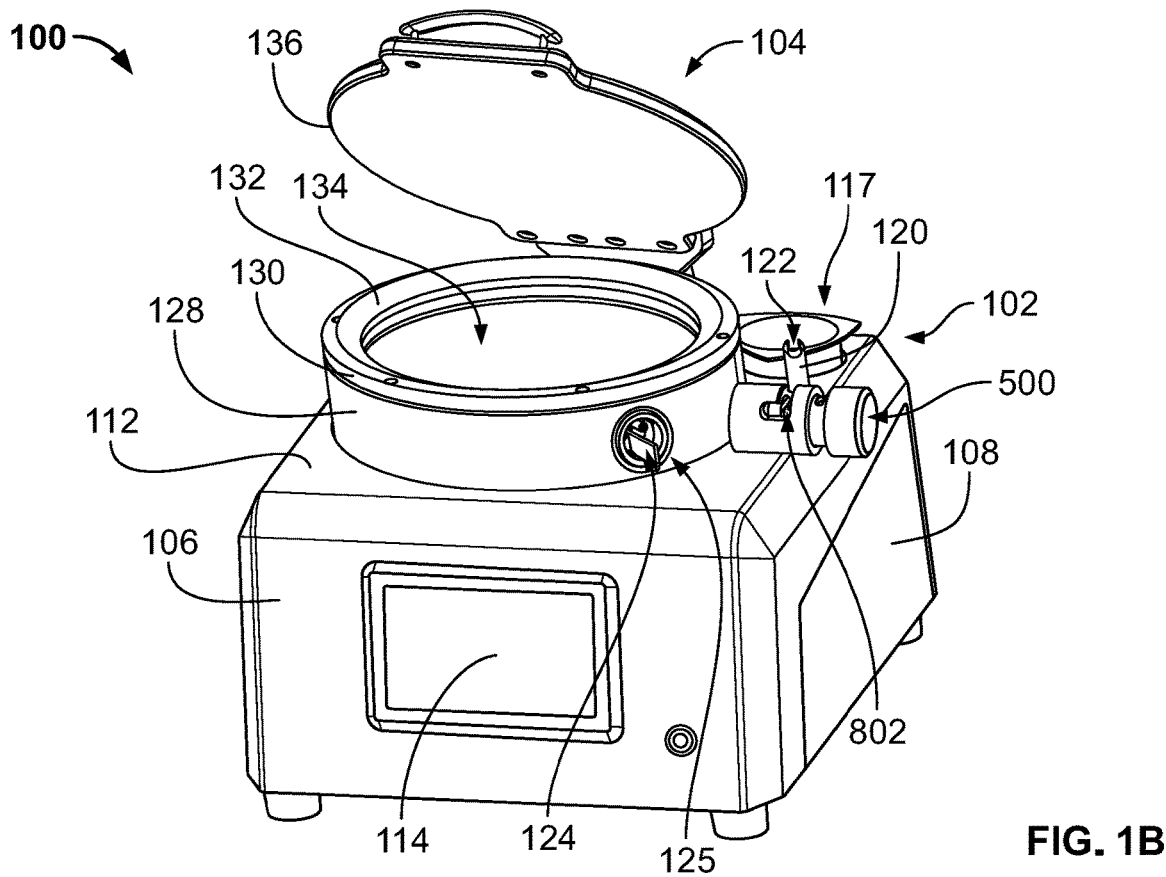
FIG. 1B shows another perspective view of the example vacuum system of FIG. 1A with the lid in an open position, in accordance with aspects of this disclosure.
Figure 2A:
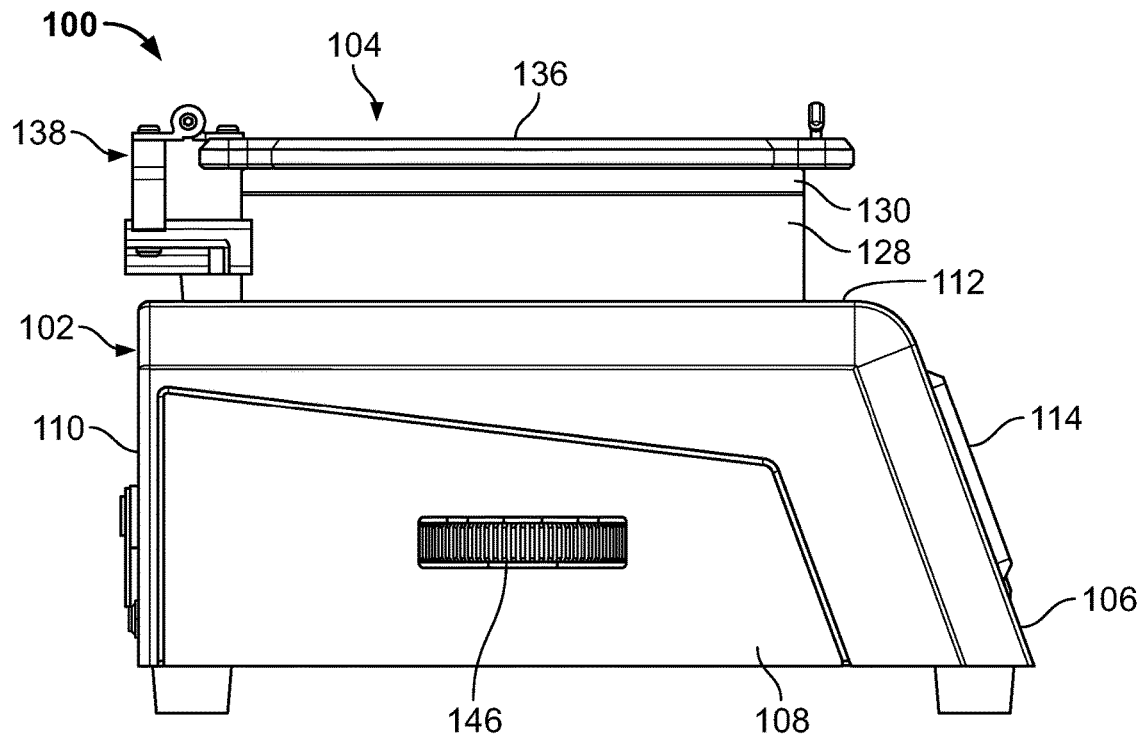
FIG. 2A shows a side view of the example vacuum system of FIG. 1A, in accordance with aspects of this disclosure.
Figure 2B:
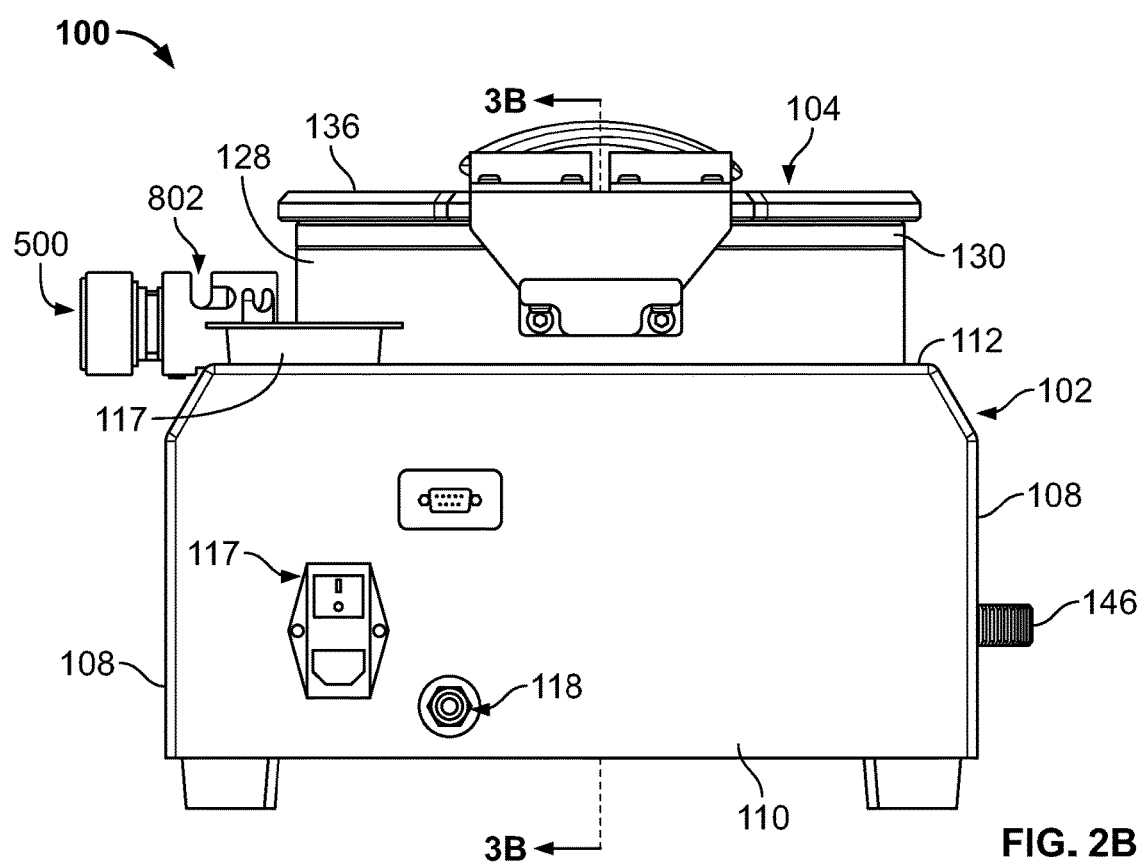
FIG. 2B shows a rear view of the example vacuum system of FIG. 1A, in accordance with aspects of this disclosure.

In the example of FIG. 1B, a reservoir 117 is positioned at least partially within a cavity formed in the ceiling 112 of the housing 102. As shown, a flow control device 500 and a pillar 120 are attached to the ceiling 112 proximate the reservoir 117. The pillar 120 includes a groove 122 configured to fit a dispensing tube (not shown). The flow control device 500 includes a channel 802 configured to receive the dispensing tube. As shown, a plug 124 having a conduit is further configured to receive an end of the dispensing tube, and bring the dispensing tube into fluid communication with a spout 126 within the vacuum chamber 104 (see, e.g., FIG. 3B). In some examples, the plug 124 may comprise a collar formed of a hard plastic material, so as to facilitate insertion into (and subsequent sealing of) a socket 125 of the vacuum chamber 104. In operation, pressure differential between the inside and outside of the vacuum chamber 104 may move epoxy resin from the reservoir 117 through the dispensing tube and into the vacuum chamber 104 via the spout 126. The flow control device 500 may control the flow of epoxy resin into the vacuum chamber 104 by pinching the dispensing tube to different degrees.

In the examples of FIGS. 1A-2B, the vacuum chamber 104 is largely defined by a cylindrical sidewall 128. As shown, a rim 130 and sealing ring 132 define an annular opening 134 of the vacuum chamber 104, along with sidewall 128. In some examples, the rim 130 may be part of sidewall 128. In the example of FIG. 1A, the opening 134 of the vacuum chamber 104 is covered by a lid 136. As shown, the lid 136 is substantially flat and circular. The lid 136 is hingedly attached to the sidewall 128 via a mechanical linkage 138 (see also FIG. 2A). As shown, the hinged attachment comprises two hinges. This hinged coupling of the lid 136 allows the lid 136 to move from the closed position of FIG. 1 to an open position in FIG. 2.

As shown, with the lid 136 in an open position, the opening 134 of the vacuum chamber 104 is uncovered. When the lid 136 is in a closed position (e.g., as shown in FIG. 1), the opening 134 is covered and the vacuum chamber 104 is substantially sealed by the arrangement of the lid 136, rim 130, and sealing ring 132, without any outside intervention. The ability to maintain the seal without any outside intervention assists with ease of use of the vacuum system 100. For example, an operator will not need to hold down the lid 136 before starting a vacuum cycle or between vacuum cycles. Additionally, the sealing arrangement requires no oil, grease, or other lubricant, which saves time and reduces certain undesirable effects using of oil, grease, and/or other lubricants. In operation, when a vacuum (or near vacuum) environment is created within the vacuum chamber 104, the lid 136 is pressed down further against the sealing ring 132 and rim 130, strengthening the seal.

Figure 3B:
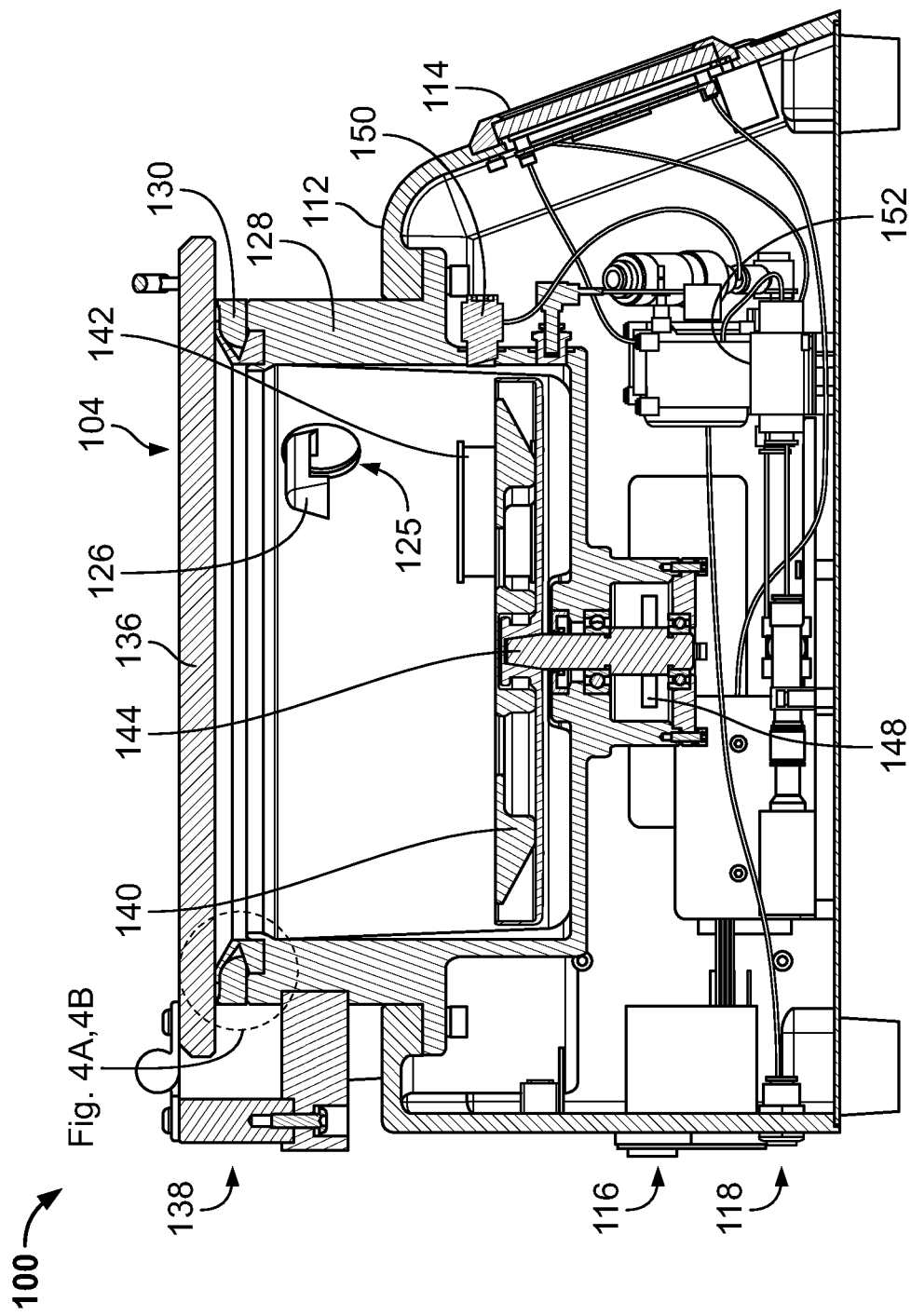
FIG. 3B shows a cross section of the example vacuum system of FIG. 1A, about the line 3B-3B in FIG. 2B, in accordance with aspects of this disclosure.

FIGS. 3A-3B show internal views of the vacuum system 100. As shown, the vacuum system 100 includes a rotatable platform 140 positioned within the vacuum chamber 104. In some examples, the platform 140 may support one or more containers 142, such as may receive epoxy via the spout 126. As shown, the rotatable platform 140 is configured for rotation via a spindle 144 that is in mechanical communication with a wheel actuator 146 via a drive belt 148. In the examples of FIGS. 1A-3A, the wheel actuator 146 protrudes through an aperture in the side panel 108 of the housing 102, so as to allow a user to easily rotate the platform 140 during operation.

In the example of FIGS. 3A-3B, the interior of the vacuum chamber 104 is in fluid communication with a port 150. As shown, the port 150 is positioned proximate a lower end and/or bottom of the vacuum chamber 104. In the examples of FIGS. 3A-3B, the port 150 is in fluid communication with a first valve 153. The first valve 153 is also in fluid communication with a vacuum generator 152. In the example of FIGS. 3A-3B, the vacuum generator 152 positioned within the housing 102. In some examples, the vacuum generator 152 may instead be positioned outside of the housing 102. In some examples the vacuum generator 152 may comprise a vacuum converter. In some examples, the vacuum generator 152 may comprise a pump. As shown, the vacuum generator 152 in fluid communication with a second valve 155. The second valve 155 is further in fluid communication with the air connector 118.

In the examples of FIGS. 3A-3B, the first valve 153 and second valve 155 are in electrical communication with the control circuitry 154. In some examples, the first valve 153 and/or second valve 155 may be solenoid valves. In some examples, the control circuitry 154 may control the first valve 153 and/or second valve 155 to open and/or close in response to one or more control signals received from the control circuitry 154.

In the example of FIG. 3A, the control circuitry 154 is in electrical communication with the user interface 114. In some examples, a user may enter parameters of one or more vacuum cycles via the user interface 114, and the parameters may be electrically communicated to the control circuitry 154. The control circuitry 154 may control the first valve 153 and/or second valve 155 accordingly. In some examples, a user may select a series of vacuum cycles via the user interface 114, as well as associated properties of the series (e.g., number of vacuum cycles, time between each cycle, time of each cycle, pressure or vacuum level for each cycle (e.g., −5 Megapascals), etc.), and the control circuitry 154 may control the first valve 153 and/or second valve 155 to open and/or close accordingly.

In some examples, the opening and/or closing of the first valve 153 and/or second valve 155 may impact (e.g., raise and/or lower) pressure within the vacuum chamber 104. For example, the control circuitry 154 may control the first valve 153 and second valve 155 (e.g., in response to user input received via the user interface 114) to reduce pressure (and/or implement a given vacuum level) within the vacuum chamber 104. In the examples of FIGS. 3A-3B, when both the first valve 153 and second valve 155 are open, the vacuum generator 152 is in fluid communication with both the vacuum chamber 104 and the air connector 118. This may allow the vacuum generator 152 to reduce pressure within the vacuum chamber 104 (e.g., using pressurized air provided via air connector 118).

As another example, the control circuitry 154 may control the second valve 155 to close and the first valve 153 to remain open (e.g., in response to user input received via the user interface 114). In the examples of FIGS. 3A-3B, when the first valve 153 is open and the second valve 155 is closed, the vacuum generator 152 is in fluid communication with the vacuum chamber 104, but not with the air connector 118. In some examples, this arrangement may allow air pressure within the vacuum generator 152 to increase and/or equalize (e.g., via air available via vacuum generator 152).

As another example, the control circuitry 154 may control the first valve 153 to remain close, (e.g., in response to user input received via the user interface 114) to maintain pressure within the vacuum chamber 104. In the examples of FIGS. 3A-3B, when the first valve 153 is closed, the vacuum generator 152 is not in fluid communication with the vacuum chamber 104. This may restrict air pressure within the vacuum generator 152 from changing, as fluid communication of the vacuum chamber 104 with anything outside the vacuum chamber 104 is restricted by the closed first valve 153.

In some examples, change in air pressure within the vacuum chamber 104 may rely on (or at least be assisted by) the lid 136 being in a closed position, with the lid 136 covering the opening 134. In examples where the air pressure is lowered, the resulting disparity in air pressure may further force the lid 136 closed, increasing the strength of the seal formed by the lid 136. Conveniently, the sealing arrangement of the lid 136, sidewalls 128, rim 130, and sealing ring 132 is sufficiently stable on its own. Thus, once the lid 136 is in the closed position, vacuum cycles may be started, stopped, and/or restarted with no need for any external influence to maintain the seal.

Figure 4B:
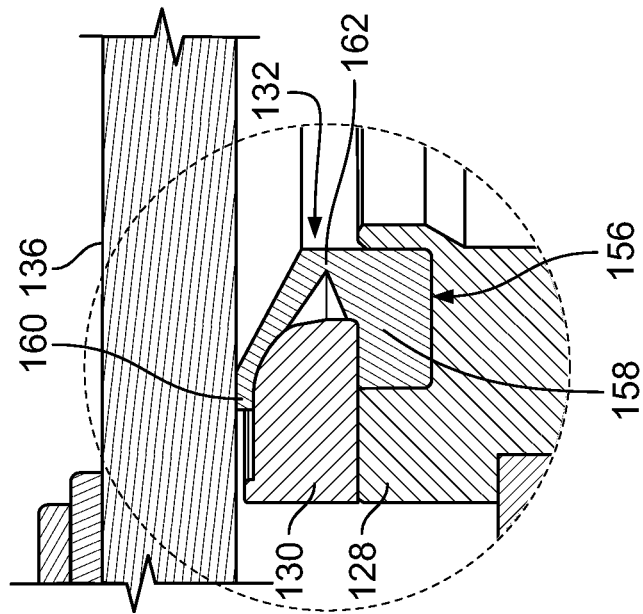
FIG. 4B shows an enlarged portion of the cross section of FIG. 3B, with the lid in a closed position, in accordance with aspects of this disclosure.
Figure 4A:
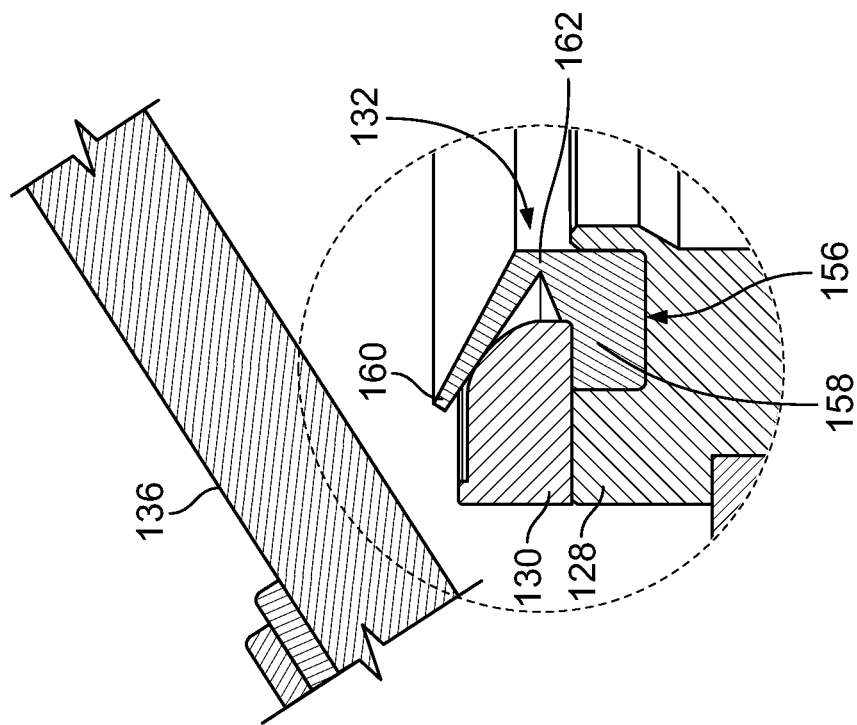
FIG. 4A shows an enlarged portion of the cross section of FIG. 3B, with the lid in an open position, in accordance with aspects of this disclosure.

In the examples of FIGS. 4A and 4B, the sealing arrangement of the lid 136, sidewalls 128, rim 130, and sealing ring 132 can be seen in more detail. As shown, an annular groove 156 is formed in the upper edge of the sidewall 128. The rim 130 overhangs a portion of the annular groove 156. A lower portion 158 of the sealing ring 132 is positioned within the annular groove 156. As shown, the lower portion 158 of the sealing ring 132 has a thickness has a lateral width that is approximately equal to that of the groove 156, and a height that is slightly greater than the distance between the floor of the groove 156 and the rim 130. This arrangement results in part of the lower portion 158 being compressed and/or pinched between the rim 130 and the sidewall 128 forming the floor of the groove 156, thereby securing the sealing ring 132 in place via a gripping frictional fit. In some examples, the rim 130 and/or sidewall 128 may be formed of a rigid material while the sealing ring 132 is formed of a more pliable, compressible material (e.g., foam, rubber, etc.) so as to facilitate this arrangement.

In the examples of FIGS. 4A and 4B, the lower portion 158 of the sealing ring 132 connects to an upper portion 160 of the sealing ring 132 at a living hinge 162. As shown, the living hinge 162 is a flexible hinge formed of the same material as the sealing ring 132. As shown, the sealing ring 132 is cut or separated proximate the living hinge 162, so as to allow the upper portion 160 to move about the living hinge 162.

In the example of FIG. 4A, the lid 136 is in an open position, and the upper portion 160 of the sealing ring 132 extends upwards over and/or away from the rim 130, into portions of the opening 134 that the lid 136 would occupy in the closed position. In the example of FIG. 4B, the lid 136 is in the closed position and pressing down on the sealing ring 132, thereby sandwiching the upper portion 160 of the sealing ring 132 between the lid 136 and the rim 130. Being a pliable material, the sealing ring 132 is compressed between the lid 136 and the rim 130, allowing the lid 136 to come to its resting closed position, while filling any gaps between the lid 136 and the rim 130, so as to create a solid seal. In some examples, the lid 136 may be of a sufficient weight to compress the upper portion 160 of the sealing ring 132 with no additional and/or outside assistance. Thus, vacuum cycles may be started, stopped, and restarted, with no need for an operator to hold down the lid 136 or make any adjustments. In operation, the sealing arrangement is further strengthened when air pressure is lowered within the vacuum chamber 104 (e.g., via the vacuum generator 152), which further forces the lid 136 downward against the sealing ring 132 and tightens the seal. The sealing arrangement also needs no oil or lubricant to function correctly as some conventional seals require, which removes the need for repeated application of the oil/lubricant and/or other detrimental effects. Further, the sealing ring 132 acts as an intermediate buffer between lid 136 and rim 130, and lessens abrasion between the two.

In operation, once the vacuum chamber 104 is sealed, and pressure within the vacuum chamber is lowered, epoxy may be drawn into the vacuum chamber 104 from the reservoir 117 via the dispensing tube (not shown). FIGS. 5A-8C show examples of a flow control device 500 of the vacuum system 100 configured to control epoxy flow through the dispensing tube. In the examples of FIGS. 1A-1B, the flow control device 500 is attached to the ceiling 112 of the housing 102 proximate the pillar 120. In the examples of FIGS. 5A-5C, the flow control device 500 includes a knob 800 fitted within a sheath 600.

In the examples of FIGS. 5A-8C, the knob 800 is configured to move between an extended position (such as shown, for example, in FIG. 5A) where a head 804 of the knob 800 extends away from the sheath 600, and a retracted position (such as shown, for example, in FIG. 5B), where the head 804 of the knob 800 is flush against the sheath 600. As shown, the knob 800 includes a channel 802, and the sheath 600 includes a window 602. The window 602 includes an arcuate slot 604 that substantially aligns with the channel 802 when the knob 800 is in the extended position of FIG. 5A. This alignment facilitates easy reception of the dispensing tube into (and/or removal of the dispensing tube from) the channel 802 when the knob 800 is in the extended position.

In the example of FIG. 6B, the knob 800 is in the retracted position, and the arcuate slot 604 does not align with the channel 802. This misalignment makes it difficult to insert or remove the dispensing tube while the knob 800 is in the retracted position. Thus, the flow control device 500 can be put in the retracted position to secure the dispensing tube within the flow control device 500 and prevent removal. As shown, the window 602 further includes two parallel lateral slots 606 connected by the arcuate slot 604. The lateral slots 606 align with the channel 802 when the knob 800 is in both the extended and retracted positions. Thus, the lateral slots 606 allow the dispensing tube to extend into, out of, and/or through the flow control device 500 when the knob 800 is in both the retracted position and extended position.

FIGS. 6A-6C show further details of the sheath 600. As shown, the sheath 600 includes a generally cylindrical body 608. The body 608 is generally hollow, with a solid back wall 610 and a bore 614 extending through the body 608 and terminating at the back wall 610. An indent 612 is formed in a top of the sheath 600, at a front of the body 608. In operation, the indent 612 may be aligned with a complementary indent 812 on the knob 800 to indicate a zero degree rotational angle of the knob 800 with respect to the sheath 600. In some examples, some other indication (e.g., marking, texturing, coloring, etc.) may be used in place of the indent 612 and/or complementary indent 812.

Figure 7:
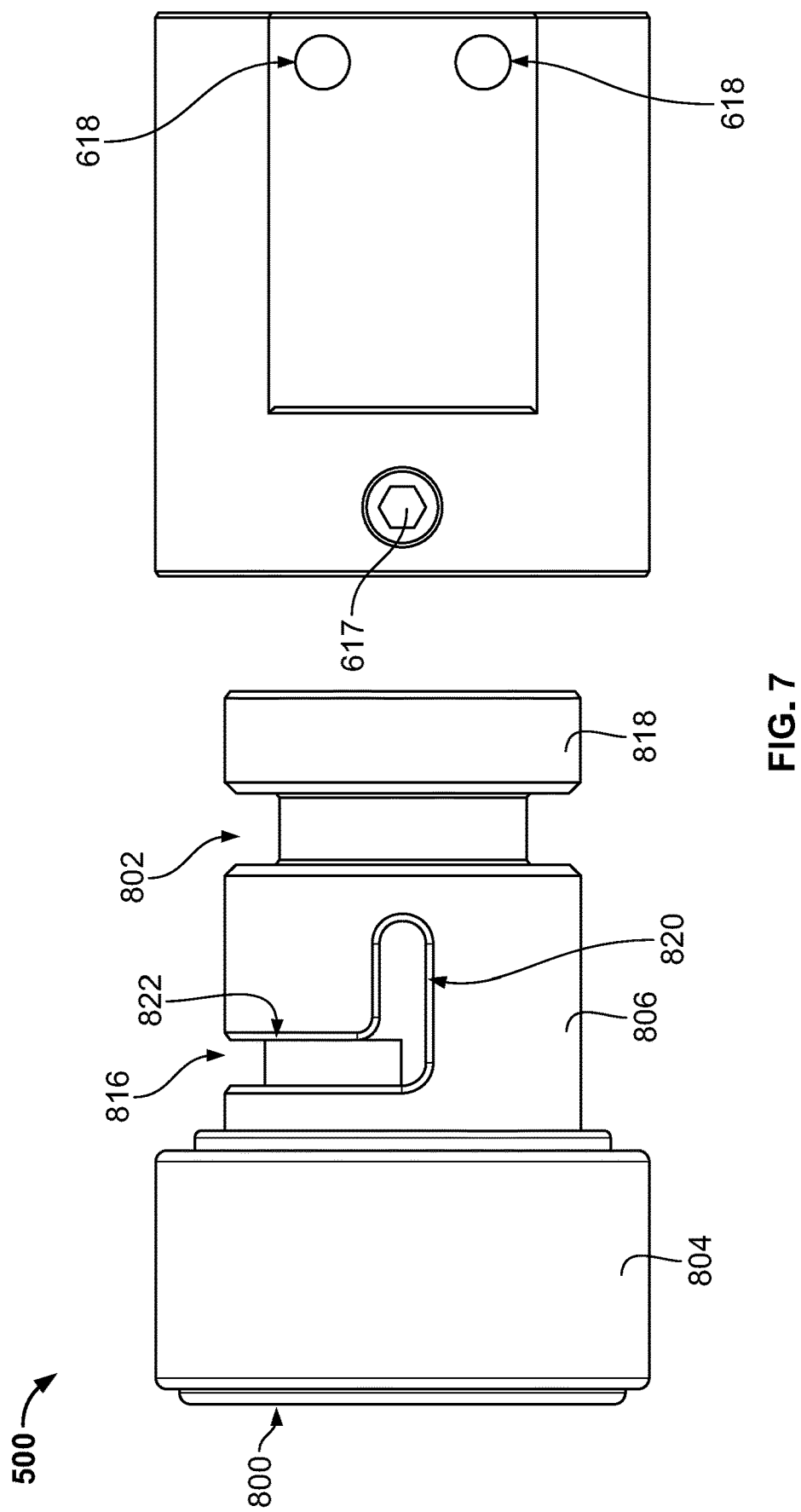
FIG. 7 shows a bottom exploded view of the example flow control device of FIG. 5A, in accordance with aspects of this disclosure.

In the examples of FIGS. 6B-6C, a protrusion 616 extends into the bore 614 on a bottom of the sheath 600, opposite (or 180 degrees from) the indent 612 in the top. In some examples, the protrusion 616 may be a bolt or other fastener inserted through an aperture formed in the bottom of the sheath 600. In the example of FIG. 6C, the protrusion 616 is the shank of a bolt, having a bolt head 617. In operation, the protrusion 616 may be fitted within a passageway 816 of the knob 800 to facilitate lateral and/or rotational movement of the knob 800. In the example of FIG. 7, the sheath 600 also includes attachment points 618 on the bottom of the sheath 600 facilitate attachment to the housing 102. In some examples the attachment points 618 may comprise holes configured for reception of screws, bolts, and/or other fasteners.

FIGS. 7-8C show further details of the knob 800. As shown, knob 800 includes a head 804 and a shaft 806. Both the head 804 and shaft 806 are generally cylindrical, with the head 804 having a larger diameter than the shaft 806. The diameter of the head 804 is larger than the diameter of the bore 614, such that the head 804 will not fit within the bore 614 of the sheath 600. However, the diameter of the shaft 806 is small enough to fit comfortably within the bore 614 of the sheath 600.

In the examples of FIGS. 7-8C, the shaft 806 includes the channel 802 and a passageway 816. As shown, the passageway 816 is formed between the channel 802 and the head 804 of the knob 800. The channel 802 is formed between the passageway 816 and an end 818 of the knob 800. As shown, the channel 802 extends all the way around the shaft 806 of the knob 800, forming an annular trench. However, in the examples of FIGS. 7-8C, the passageway 816 only extends over a portion of the shaft 806, which limits the potential movement of the knob 800 within the sheath 600. The passageway 816 is configured to slidably fit the protrusion 616 therein, such that the knob 800 can move over the protrusion 616 (and the protrusion 616 can move within the passageway 816) when the knob 800 is moved between the extended and retracted positions, and between rotational positions.

In the examples of FIGS. 7-8C, the passageway 816 includes a lateral portion 820 and an arcuate portion 822. As shown, the arcuate portion 822 extends in an arc from the lateral portion 820 to a position approximately aligned with the complementary indent 812 of the knob 800. As shown, the lateral portion 820 extends approximately perpendicular to the arcuate portion 822 and channel 802 of the dispensing knob 800, and approximately parallel to the lateral slots 606.

In the examples of FIGS. 7-8C, the lateral portion 820 of the passageway 816 intersects with the arcuate portion 822, which allows the protrusion 616 to transition from one portion of the passageway 816 to another. In operation, the protrusion 616 moves within the lateral portion 820 when the knob 800 is moved between the extended and retracted positions. The protrusion 616 is farthest from the intersection of the lateral portion 820 and arcuate portion 822 when the knob 800 is extended as far as possible from the sheath 600 (e.g., such as shown in FIG. 5A). The length of the lateral portion 820 limits how far the knob 800 can extend away from the sheath 600.

While in the extended position, the knob 800 can only move laterally between the extended and retracted positions, because the lateral portion 820 of the passageway 816 is the only path available for the protrusion 616 to travel. When moving laterally, the complementary indent 812 formed on the head 804 of the knob 800 is aligned with the indent 612 on the sheath 600. However, once in the retracted position (e.g., of FIG. 5B), the protrusion 616 will reach the intersection between the lateral portion 820 and arcuate portion 822 of the passageway 816, and thus be in a position to travel through the arcuate portion 822, allowing for rotational movement of the knob 800.

The knob 800 is configured for rotational movement within the sheath 600 when in the retracted position (e.g., such as shown in FIG. 5C). In operation, the protrusion 616 moves within the arcuate portion 822 of the passageway 816 when the knob 800 rotates within the sheath 600. IN the example of FIG. 5C, when the protrusion 616 moves within the arcuate portion 822 of the passageway 816 out of alignment with the lateral portion 820, the complementary indent 812 formed on the head 804 of the knob 800 likewise moves out alignment with the indent 612 on the sheath 600. Thus, an operator can see quickly how far the knob 800 has been rotated, and/or if the knob 800 can be moved laterally.

In the examples of FIGS. 8A-8C, the channel 802 of the knob 800 has a depth D that varies depending on the rotational position of the knob 800. As shown, the depth D of the channel 802 decreases as the knob 800 is rotated. FIGS. 8A-8C show examples of the knob 800 at different rotational positions, illustrating this decreasing variation. In particular, the examples of FIGS. 8A-8C show the depth D of the channel 802 where the dispensing tube would be positioned (e.g., in alignment with the lateral slots 606 of the sheath 600). In the example of FIG. 8A, the knob 800 has not been rotated (i.e., 0 degree rotation). As shown, the depth D in FIG. 8A is relatively large. In the example of FIG. 8B, the knob 800 has been rotated approximately forty-five degrees (i.e., some rotation). As shown, the depth D in FIG. 8B is less than in FIG. 8A. In the example of FIG. 8C, the knob 800 has been rotated approximately ninety degrees (i.e., full rotation). As shown, the depth D in FIG. 8C is less than in both FIGS. 8A and 8B.

The varying depth D of the channel 802 allows an operator to vary flow of epoxy through the dispensing tube by turning the knob 800 when in the retracted position. When the knob 600 is in the retracted position, the dispensing tube remains substantially aligned with the lateral slots 606 of the sheath 600. However, the depth D of the channel 802 in alignment with the lateral slots 606 decreases as the knob 800 is rotated. Thus, while the dispensing tube fits comfortably within the channel 802 when the knob 800 is at 0 degrees of rotation (e.g., FIG. 5A), the dispensing tube begins to become pinched (e.g., between the shaft 806 defining the bottom of the channel 802 and the sheath 600) when the angle of rotation increases. The more the knob 800 is turned, the smaller the depth D of the channel 802 gets, and the more the dispensing tube is pinched. The more the dispensing tube is pinched, the more the flow of epoxy through the dispensing tube is restricted. Thus, an operator may adjust the flow of epoxy through the dispensing tube by changing the rotation of the knob 800 within the sheath 600.

As discussed above, however, the knob 800 may only be rotated after put into the retracted position. Thus, an operator may prevent accidental flow restriction by positioning the knob in the extended position. Additionally, while in the extended position, the window 602 allows for the dispensing tube to be easily inserted and/or removed with minimal effort and/or awkwardness.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A vacuum system for epoxy mounting of material samples, comprising:
    a vacuum chamber that is substantially hollow, the vacuum chamber comprising:
        a sidewall having a rim overhanging a groove, the rim defining a perimeter of an opening,
        a flexible seal having a lower portion fit within the groove and an upper portion overlaying at least a portion of the rim such that the portion of the rim is sandwiched between the lower and the upper portions of the flexible seal, and
        a lid movable between an open position in which the opening is uncovered and a closed position in which the lid covers the opening, wherein the upper portion of the flexible seal is sandwiched between the lid and the rim when the lid is in the closed position, thereby sealing the opening.

2. The system of claim 1, wherein the upper portion and the lower portion of the flexible seal are connected at a living hinge.

3. The system of claim 1, wherein the upper portion extends away from the rim when the lid is in the open position.

4. The system of claim 1, further comprising a vacuum generator in fluid communication with the vacuum chamber, the vacuum generator configured to lower air pressure within the vacuum chamber.

5. The system of claim 4, further comprising a user interface in electrical communication with control circuitry, the control circuitry configured to control the vacuum generator to cyclically lower air pressure within the vacuum chamber based on input received via the user interface.

6. The system of claim 5, wherein the input comprises one or more of a number of vacuum cycles, a vacuum level of each vacuum cycle, a time between vacuum cycles, or a time of each vacuum cycle.

7. The system of claim 4, further comprising a housing, the vacuum chamber and the vacuum generator being positioned at least partially within the housing.

8. The system of claim 7, further comprising a rotatable platform positioned within the vacuum chamber, the rotatable platform configured for rotation via an actuator that extends through an aperture of the housing.

9. The system of claim 1, wherein the sidewall comprises a socket configured to receive a plug, the plug comprising a spout configured to dispense epoxy within the vacuum chamber.

10. The system of claim 1, wherein the lid is hingedly coupled to the sidewall.

11. The system of claim 1, wherein the sidewall comprises a socket configured to receive a plug, the plug comprising a spout configured to dispense epoxy within the vacuum chamber.

12. The system of claim 1, wherein the lid is hingedly coupled to the sidewall.

13. The system of claim 1, wherein the upper and the lower portions are connected on an inner circumference of the flexible seal.

14. A vacuum system for epoxy mounting of material samples, comprising:
    a vacuum chamber comprising:
        a cylindrical sidewall having a groove;
        an annular rim positioned at least partially over the groove;
        a sealing ring having a first portion and a second portion, the first portion being positioned in the groove;
        an opening defined by the cylindrical sidewall, annular rim, and sealing ring; and
    a lid movable between an open position in which the opening is uncovered and a closed position in which the lid covers the opening, wherein the second portion of the sealing ring is sandwiched between the lid and the rim when the lid is in the closed position, thereby sealing the opening.

15. The system of claim 14, wherein the first portion and the second portion of the sealing ring are connected at a living hinge.

16. The system of claim 14, wherein at least a portion of the first portion is raised over the rim when the lid is in the open position.

17. The system of claim 14, further comprising a vacuum generator in fluid communication with the vacuum chamber, the vacuum generator configured to adjust air pressure within the vacuum chamber.

18. The system of claim 17, further comprising a user interface in electrical communication with control circuitry, the control circuitry configured to control the vacuum generator to cyclically adjust air pressure within the vacuum chamber based on input received via the user interface.

19. The system of claim 18, wherein the input comprises one or more of a number of vacuum cycles, a vacuum level of each vacuum cycle, a time for each vacuum cycle, or a time between vacuum cycles.

20. The system of claim 17, further comprising a housing, the vacuum chamber and the vacuum generator being positioned at least partially within the housing.

21. The system of claim 20, further comprising a rotatable platform positioned within the vacuum chamber, the rotatable platform configured for rotation via an actuator that extends through an aperture of the housing.

* * * * *